US012686090B2

(12) United States Patent
Taga et al.

(10) Patent No.: US 12,686,090 B2
(45) Date of Patent: Jul. 21, 2026

(54) MACHINE TOOL

(71) Applicant: DMG MORI CO., LTD., Nara (JP)

(72) Inventors: Mitsuru Taga, Nara (JP); Tadaharu Morimoto, Nara (JP); Yoshinori Yamamoto, Nara (JP); Tatsuya Aizawa, Nara (JP); Yusuke Ikeda, Nara (JP); Ryohei Kusama, Nara (JP)

(73) Assignee: DMG MORI CO., LTD., Nara (JP)

( * ) Notice: Subject to any disclaimer, the term of this patent is extended or adjusted under 35 U.S.C. 154(b) by 309 days.

(21) Appl. No.: 18/286,352

(22) PCT Filed: Apr. 15, 2021

(86) PCT No.: PCT/JP2021/015558
§ 371 (c)(1),
(2) Date: Oct. 10, 2023

(87) PCT Pub. No.: WO2022/219772
PCT Pub. Date: Oct. 20, 2022

(65) Prior Publication Data
US 2024/0189954 A1     Jun. 13, 2024

(51) Int. Cl.
*B23Q 3/00*          (2006.01)
*B23Q 3/10*          (2006.01)
(Continued)

(52) U.S. Cl.
CPC .............. *B23Q 3/005* (2013.01); *B23Q 5/36* (2013.01); *B23Q 5/408* (2013.01); *B23Q 3/103* (2013.01)

(58) Field of Classification Search
CPC .......... B23Q 3/005; B23Q 3/002; B23Q 3/10; B23Q 3/105; B23Q 5/22; B23Q 5/225;
(Continued)

(56) References Cited

U.S. PATENT DOCUMENTS

| | | | |
|---|---|---|---|
| 5,688,084 A | 11/1997 | Fritz et al. | |
| 5,933,933 A | 8/1999 | Fritz et al. | |

(Continued)

FOREIGN PATENT DOCUMENTS

| | | | | |
|---|---|---|---|---|
| DE | 102017122439 A1 * | 4/2018 | ........ | B23Q 3/15539 |
| JP | H06297286 A | 10/1994 | | |

(Continued)

OTHER PUBLICATIONS

Machine translation of DE 10 2017 122439 A1 (Year: 2018).*

*Primary Examiner* — Christopher J. Besler
(74) *Attorney, Agent, or Firm* — IP Business Solutions, LLC.

(57) ABSTRACT

A machine tool includes a bed, and a table that is provided on the bed and movable in a Z-axis direction. The table includes a workpiece holder, a table base including a first support portion and a second support portion for turnably supporting the workpiece holder at positions spaced from each other in an X-axis direction, the workpiece holder being mounted on the table base, and a turning device that is provided in the first support portion, and turns the workpiece holder around a turning center axis extending in the X-axis direction. The machine tool further includes a first feeding device and a second feeding device that are provided on the bed and are connected to the first support portion and the second support portion respectively to drive the table in the Z-axis direction.

5 Claims, 8 Drawing Sheets

(51) Int. Cl.
 _B23Q 5/36_ (2006.01)
 _B23Q 5/40_ (2006.01)
(58) Field of Classification Search
 CPC ... B23Q 5/36; B23Q 5/40; B23Q 1/48; B23Q
 1/4857; B23Q 1/015; B23C 1/14
 See application file for complete search history.

(56) References Cited

U.S. PATENT DOCUMENTS

| | | | |
|---|---|---|---|
| 2002/0051687 A1* | 5/2002 | Harami | B23Q 1/4857 |
| | | | 409/137 |
| 2008/0175684 A1 | 7/2008 | Schmitt et al. | |
| 2009/0123246 A1 | 5/2009 | Matsui | |
| 2009/0238655 A1 | 9/2009 | Schmitt et al. | |
| 2019/0193218 A1 | 6/2019 | Bauer | |

FOREIGN PATENT DOCUMENTS

| | | |
|---|---|---|
| JP | 2008-023709 A | 2/2008 |
| JP | 2011025386 A | 2/2011 |
| JP | 2018058205 A | 4/2018 |
| WO | 2007148620 A1 | 12/2007 |
| WO | 2017080760 A1 | 5/2017 |

* cited by examiner

FIG.3

MACHINE TOOL

TECHNICAL FIELD

The present invention relates to a machine tool.

BACKGROUND ART

For example, WO2017/080760 (PTL 1) discloses a machine tool including a machine bed, and a workpiece positioning device that is provided on the machine bed and is movable in a Z-axis direction. The workpiece positioning device is configured to be turnable around an axis parallel to a horizontal direction.

CITATION LIST

Patent Literature

PTL 1: WO2017/080760

SUMMARY OF INVENTION

Technical Problem

As disclosed in the above-mentioned PTL 1, there is known a machine tool including a table (cradle type table) that is turnable around an axis (A axis) parallel to a horizontal direction. In such a machine tool, the table including a mechanism for turning is heavy, so that there is a possibility that smooth movement cannot be performed when the table is moved in the horizontal direction.

Therefore, an object of the present invention is to solve the above-mentioned problem, and provide a machine tool capable of smoothly moving a cradle type table in a horizontal direction.

Solution to Problem

A machine tool according to the present invention comprise a bed and a table that is provided on the bed and is movable in a first axial direction parallel to a horizontal direction. The table comprises a workpiece holder that detachably holds a workpiece, a table base having a first support portion and a second support portion that turnably support the workpiece holder at positions spaced from each other in a second axial direction which is parallel to the horizontal direction and orthogonal to the first axial direction, the workpiece holder being mounted on the table base, and a turning device that is provided in the first support portion and turns the workpiece holder around a turning center axis extending in the second axial direction. The machine tool further comprises a first feeding device and a second feeding device that are provided on the bed and are connected to the first support portion and the second support portion respectively to drive the table in the first axial direction.

According to the thus-configured machine tool, the first feeding device is connected to the first support portion of the table base provided with the turning device, and the second feeding device is connected to the second support portion of the table base which is not provided with the turning device. As a result, when the table moves in the first axial direction, the first support portion and the second support portion follow each other well, so that the table can be moved smoothly in the first axial direction.

Preferably, the bed has a first peripheral wall portion and a second peripheral wall portion that are provided at both end portions of the bed in the second axial direction and extend in the first axial direction while forming upward rising wall shapes. The first feeding device and the second feeding device are provided on the first peripheral wall portion and the second peripheral wall portion, respectively.

According to the thus-configured machine tool, the first feeding device and the second feeding device are provided on the first peripheral wall portion and the second peripheral wall portion of the bed which form upward rising wall shapes respectively, so that the first feeding device and the second feeding device can be provided near an upper position where the center of gravity of the table is located. As a result, it is possible to restrain occurrence of vibration when the table moves in the first axial direction.

Preferably, the table base includes a first table base having the first support portion, and a second table base that has the second support portion and is provided apart from the first table base in the second axial direction.

According to the thus-configured machine tool, the first feeding device is connected to the first support portion of the first table base, and the second feeding device is connected to the second support portion of the second table base. As a result, the table can be smoothly moved in the first axial direction despite the structure in which the table base is divided into the first table base and the second table base.

Preferably, the machine tool further comprises a first guide portion and a second guide portion that are provided on the first table base and guide the first table base along the first axial direction, and a third guide portion and a fourth guide portion that are provided on the second table base and guide the second table base along the first axial direction. The first guide portion is arranged at a position which is displaced upward in the second axial direction from the second guide portion, and the third guide portion is arranged at a position which is displaced upward in the second axial direction from the fourth guide portion.

According to the thus-configured machine tool, since the first guide portion is arranged at a position which is displaced upward in the second axial direction from the second guide portion, the distance between the first guide portion and the second guide portion can be made larger. Moreover, since the third guide portion is arranged at a position which is displaced upward in the second axial direction from the fourth guide portion, the distance between the third guide portion and the fourth guide portion can be made larger. As a result, the first table base can be more stably guided along the first axial direction by the first guide portion and the second guide portion. Further, the second table base can more stably guided along the first axial direction by the third guide portion and the fourth guide portion.

Preferably, the first feeding device is arranged side by side with the first guide portion in the second axial direction. The second feeding device is arranged side by side with the third guide portion in the second axial direction.

According to the thus-configured machine tool, since the first feeding device is arranged side by side with the first guide portion which is arranged above the second guide portion in the second axial direction, and the second feeding device is arranged side by side with the third guide portion which is arranged above the fourth guide portion in the second axial direction, the first feeding device and the second feeding device can be provided near an upper position where the center of gravity of the table is located. As a result, it is possible to restrain occurrence of vibration when the table moves in the first axial direction.

3 | 4

Preferably, the bed includes a first peripheral wall portion and a second peripheral wall portion that are provided at both end portions of the bed in the second axial direction and extend in the first axial direction while forming upward rising wall shapes, a first step portion forming a step that is recessed downward from the first peripheral wall portion, and a second step portion forming a step that is recessed downward from the second peripheral wall portion. The first guide portion and the third guide portion are provided on the first peripheral wall portion and the second peripheral wall portion, respectively. The second guide portion and the fourth guide portion are provided on the first step portion and the second step portion, respectively.

According to the thus-configured machine tool, the step structure formed by the first peripheral wall portion and the first step portion is used to be capable of providing the second guide portion and the first guide portion arranged at a position which is displaced upward in the second axial direction from the second guide portion, and the step structure formed by the second peripheral wall portion and the second step portion is used to be capable of providing the fourth guide portion and the third guide portion arranged at a position which is displaced upward in the second axial direction from the fourth guide portion.

Preferably, the first table base includes a first base upper end portion provided with the first guide portion, a first base lower end portion provided with the second guide portion, and a first base intermediate portion that extends obliquely downward along the second axial direction from the first base upper end portion to the first base lower end portion and faces the workpiece holder in a vertical direction. The second table base includes a second base upper end portion provided with the third guide portion, a second base lower end portion provided with the fourth guide portion, and a second base intermediate portion that extends obliquely downward along the second axial direction from the second base upper end portion to the second base lower end portion and faces the workpiece holder in the vertical direction.

According to the thus-configured machine tool, a maximum workpiece area (a maximum area which the workpiece can occupy) when the table is in an inverted posture centered on the rotation center axis can be provided between the first base intermediate portion and the second base intermediate portion in the second axial direction.

Advantageous Effect of Invention

As described above, according to the present invention, it is possible to provide a machine tool capable of smoothly moving a cradle type table in a horizontal direction.

BRIEF DESCRIPTION OF DRAWINGS

FIG. 3 is a top view showing the machine tool in FIG. 1.

DESCRIPTION OF EMBODIMENT

Figure 1:
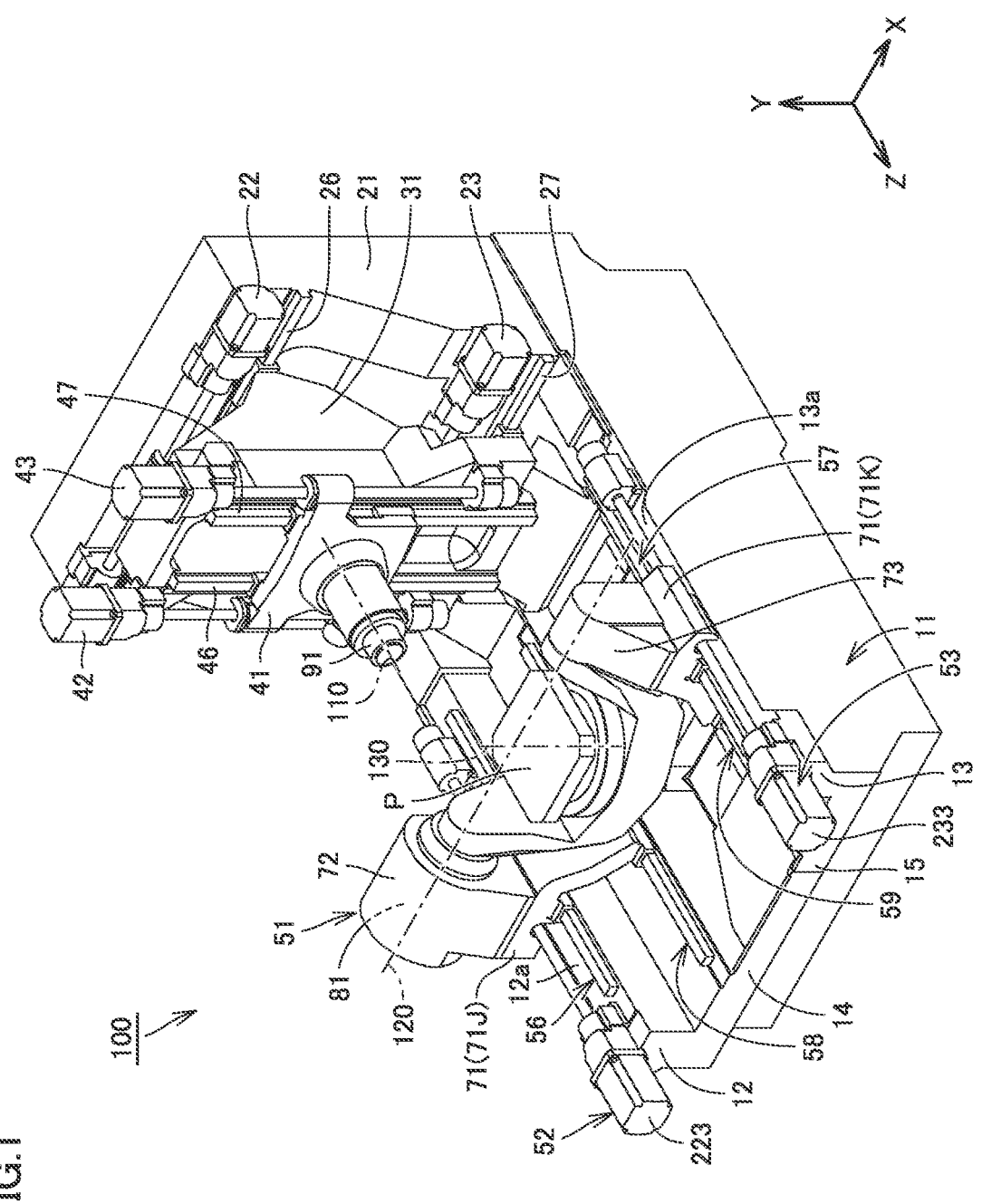
FIG. 1 is a perspective view showing a machine tool (when a table is in a reference posture) according to an embodiment of the present invention.

An embodiment of the invention will be described with reference to the drawings. In the drawings to be referred to below, the same or corresponding members are given the same reference numerals.

Figure 2:
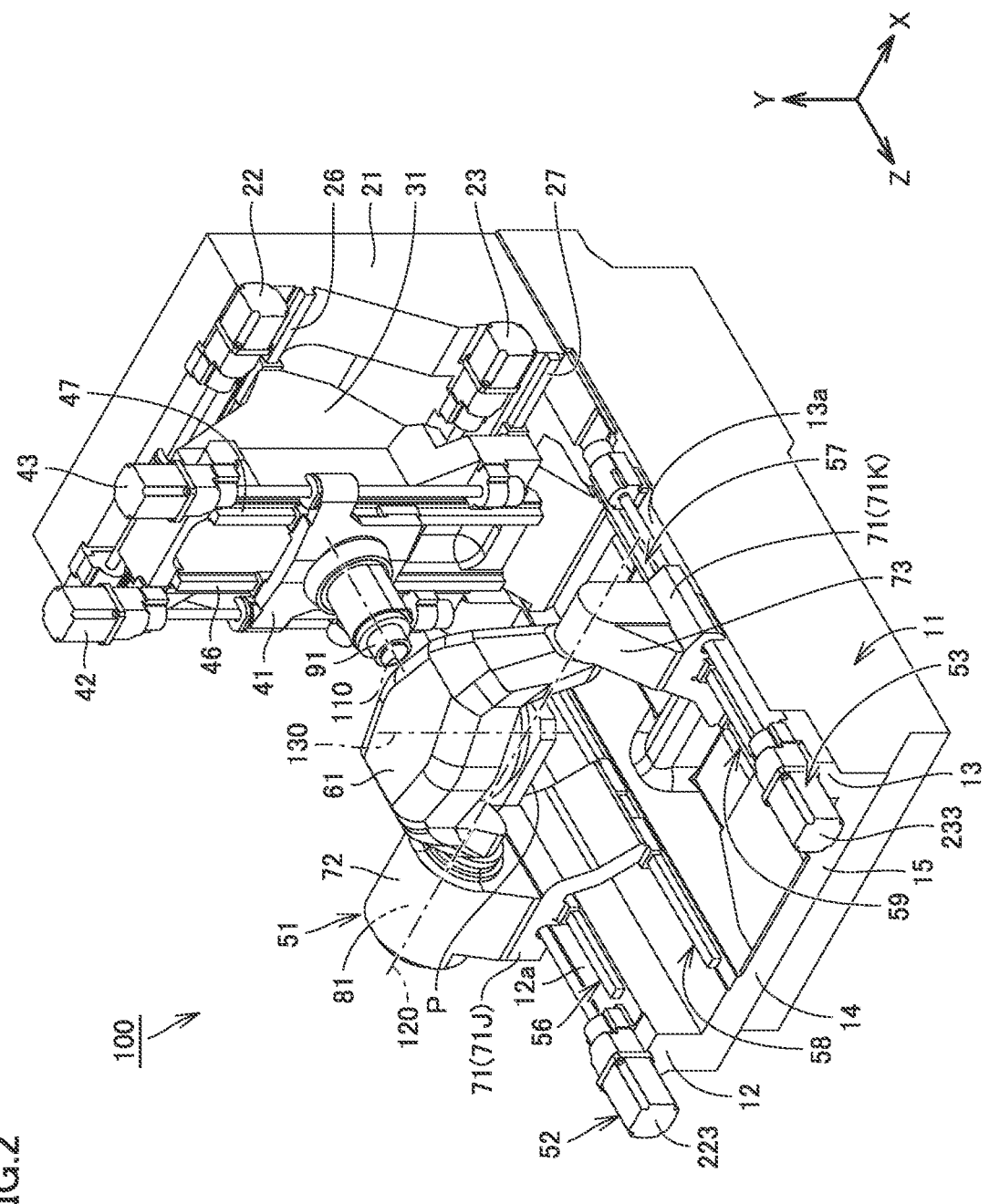
FIG. 2 is a perspective view showing the machine tool (when the table is in an inverted posture) according to the embodiment of the present invention.
Figure 3:
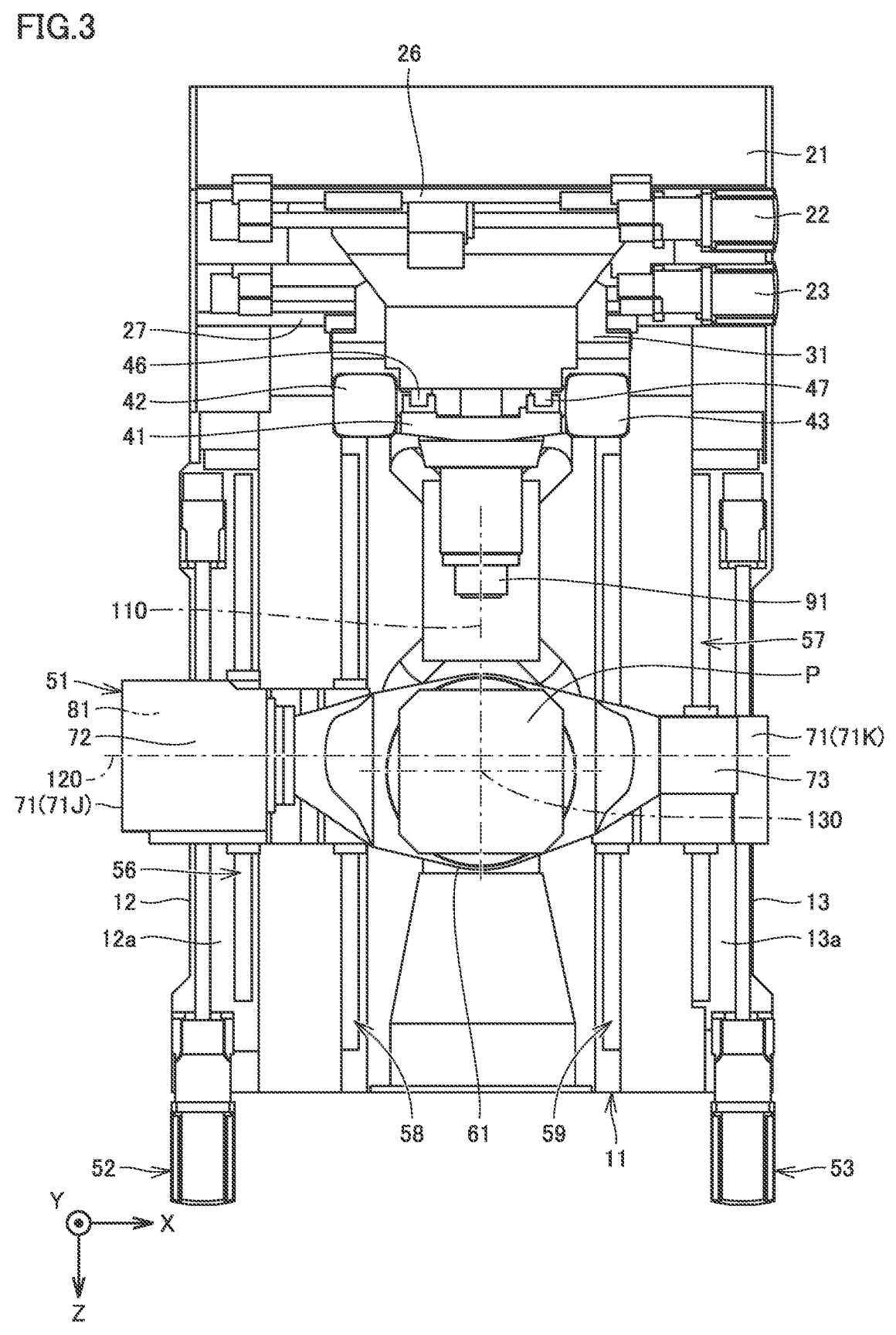
Figure 4:
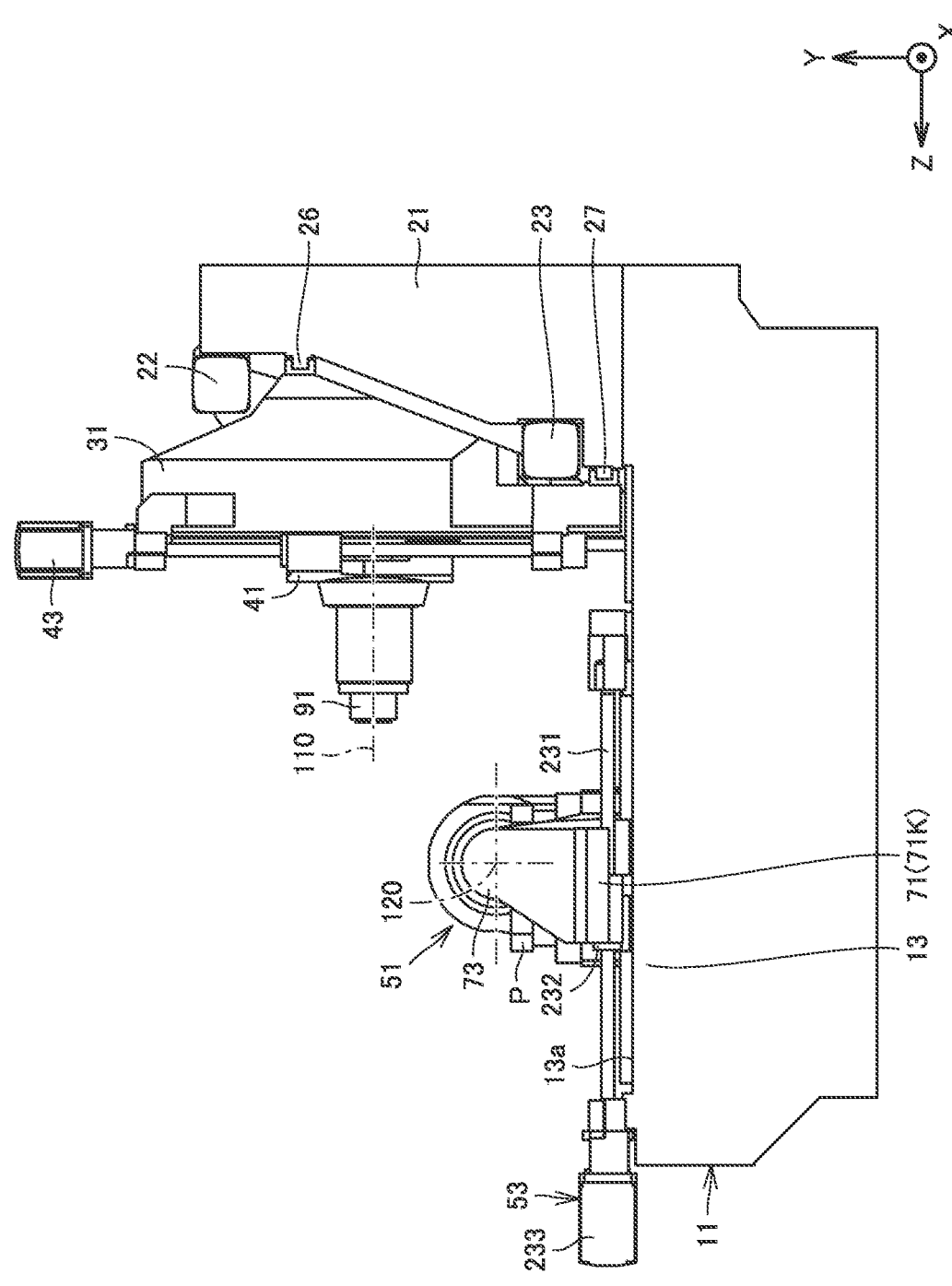
FIG. 4 is a side view showing the machine tool in FIG. 1.

FIG. 1 is a perspective view showing a machine tool (when a table is in a reference posture) according to the embodiment of the present invention. FIG. 2 is a perspective view showing the machine tool (when the table is in an inverted posture) according to the embodiment of the invention. FIG. 3 is a top view showing the machine tool in FIG. 1. FIG. 4 is a side view showing the machine tool in FIG. 1.

In the figures, an internal structure of the machine tool is shown by looking through a cover body that forms the exterior of the machine tool.

Referring to FIGS. 1 to 4, a machine tool 100 according to the present embodiment is a machining center for machining a workpiece by bringing a rotating tool into contact with the workpiece, and more specifically, a horizontal machining center in which the rotation center axis of a tool extends in a horizontal direction. Machine tool 100 is an NC (Numerically Controlled) machine tool in which various operations for machining a workpiece are automated by numerical control using a computer.

In the present specification, an axis that is parallel to the horizontal direction and parallel to the rotation center axis of the tool is referred to as the "Z-axis (first axis)", an axis that is parallel to the horizontal direction and orthogonal to the rotation center axis of the tool is referred to as "X-axis (second axis)", and an axis parallel to a vertical direction is referred to as "Y-axis". The left direction in FIG. 4 is a "+Z-axis direction", and the right direction is a "−Z axis direction". The right direction in FIG. 3 is a "+X axis direction", the left direction is a "−X axis direction", the upward direction is a "+Y axis direction", and the downward direction is a "−Y-axis direction".

First, the overall structure of machine tool 100 will be described. Machine tool 100 has a bed 11, a column 21, a saddle 31, a cross slide 41, a tool spindle 91, and a table 51.

Bed 11 is a base member for supporting column 21, saddle 31, cross slide 41, tool spindle 91, table 51, etc., and is installed on the floor of a factory or the like. Bed 11 is made of metal such as cast iron.

Bed 11 has a rectangular shape having long sides extending in the Z-axis direction and short sides extending in the X-axis direction when viewed from above. The length (height) of bed 11 in the Y-axis direction is smaller than the length of bed 11 in the Z-axis direction and smaller than the length of bed 11 in the X-axis direction.

Bed 11 has a first peripheral wall portion 12 and a second peripheral wall portion 13. First peripheral wall portion 12 and second peripheral wall portion 13 are provided on the periphery of bed 11 when viewed from above. First peripheral wall portion 12 and second peripheral wall portion 13 are provided at both end portions of bed 11 in the X-axis direction. First peripheral wall portion 12 is provided at an end portion of bed 11 in the −X-axis direction. Second peripheral wall portion 13 is provided at an end portion of bed 11 in the +X-axis direction. First peripheral wall portion 12 and second peripheral wall portion 13 extend in the Z-axis direction while forming upward rising wall shapes.

First peripheral wall portion 12 has a first top surface 12a. Second peripheral wall portion 13 has a second top surface 13a. First top surface 12a and second top surface 13a are planes parallel to an X-axis-Z-axis plane. First top surface 12a and second top surface 13a face upward.

Column 21 is erected on bed 11. Column 21 as a whole has a gate-like shape rising upward from bed 11. Column 21 is fixed to bed 11. Column 21 is arranged at an end portion of bed 11 in the −Z-axis direction.

Saddle 31 is supported by column 21. Saddle 31 is provided on the front surface of column 21 facing in the +Z-axis direction. Saddle 31 as a whole has a gate-like shape rising upward from bed 11. Saddle 31 is provided to be movable in the X-axis direction with respect to column 21 by feeding devices 22 and 23 and guide portions 26 and 27 provided on column 21 and the like.

Cross slide 41 is supported by saddle 31. Cross slide 41 is provided on the front surface of saddle 31 facing in the +Z-axis direction. Cross slide 41 as a whole has a plate-like shape parallel to an X-axis-Y-axis plane. Cross slide 41 is provided to be movable in the Y-axis direction (vertical direction) with respect to saddle 31 by feed devices 42 and 43 and guide portions 46 and 47 provided on saddle 31 and the like.

Tool spindle 91 is supported by cross slide 41. Tool spindle 91 is fixed to cross slide 41. Tool spindle 91 protrudes from cross slide 41 in the +Z-axis direction.

Tool spindle 91 is provided so as to be driven rotatably around a center axis 110 parallel to the Z-axis by a motor. A tool for machining a workpiece in machine tool 100 is held on tool spindle 91. As tool spindle 91 rotates, the tool held on tool spindle 91 rotates around center axis 110.

Table 51 is supported by bed 11. Table 51 is provided on bed 11. Table 51 is provided at a position away from column 21, saddle 31 and cross slide 41 in the +Z-axis direction. Table 51 is a device for holding the workpiece. Table 51 holds the workpiece at a position facing tool spindle 91 in the Z-axis direction.

Figure 5:
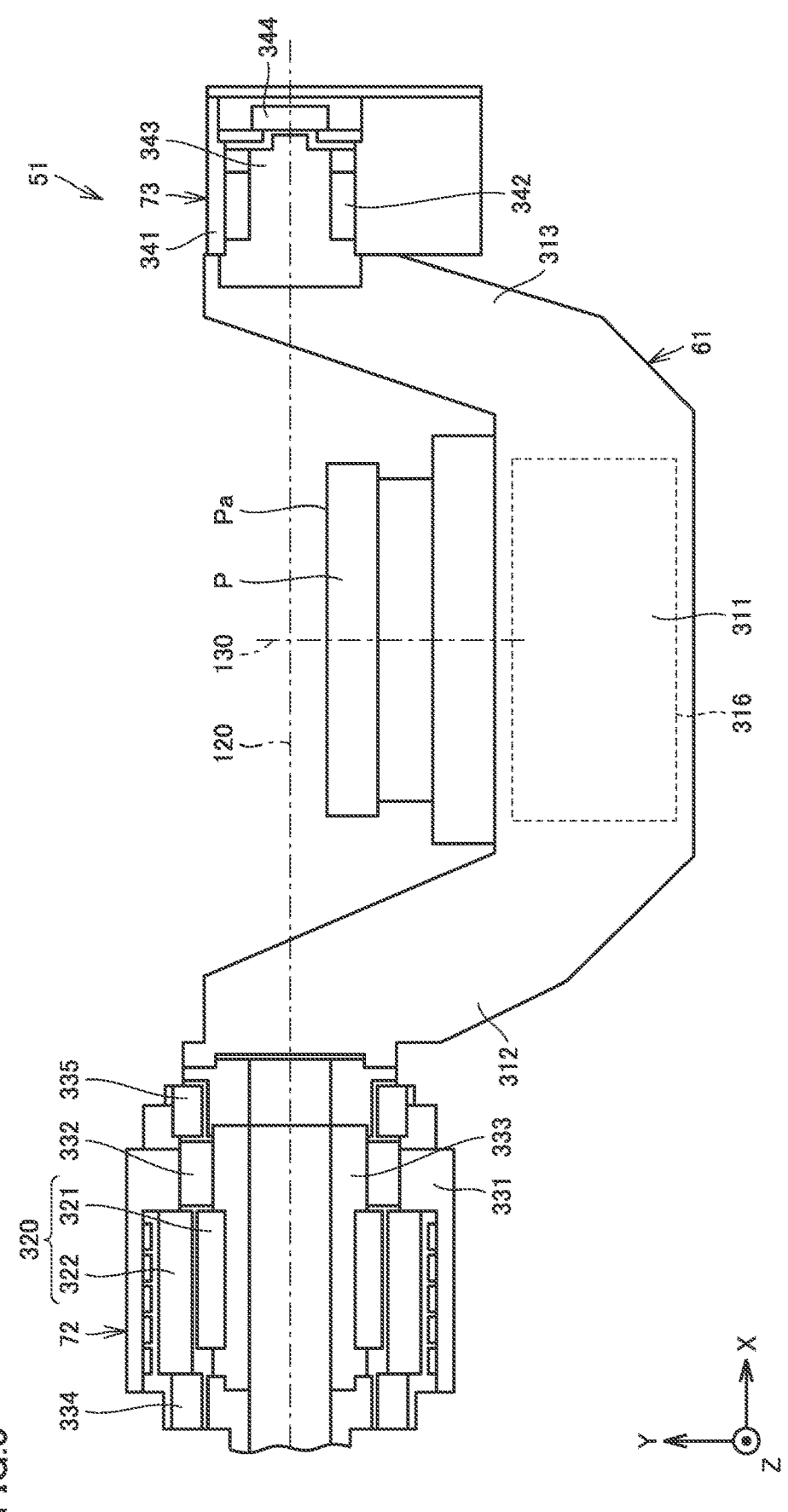
FIG. 5 is a cross-sectional view showing the table.

Next, the structure of table 51 will be explained in detail. FIG. 5 is a cross-sectional view showing the table. Referring to FIGS. 1 to 5, table 51 includes a workpiece holder 61, a table base 71, and a turning device 81.

Workpiece holder 61 is provided on bed 11. Workpiece holder 61 is provided astride first peripheral wall portion 12 and second peripheral wall portion 13 when viewed from above. Workpiece holder 61 is supported by table base 71. Workpiece holder 61 detachably holds the workpiece. A pallet P is detachably attached to workpiece holder 61. As shown in FIG. 5, pallet P has a main surface Pa. A jig such as an angle rest to which the workpiece is attached is mounted on main surface Pa.

Table base 71 has workpiece holder 61 mounted thereon. Table base 71 has a first support portion 72 and a second support portion 73. First support portion 72 and second support portion 73 face each other through workpiece holder 61 in the X-axis direction. First support portion 72 and second support portion 73 support workpiece holder 61 at positions spaced from each other in the X-axis direction so that workpiece holder 61 is turnable. First support portion 72 supports workpiece holder 61 at a position spaced upward from first top surface 12a. Second support portion 73 supports workpiece holder 61 at a position spaced upward from second top surface 13a.

Turning device 81 is provided in first support portion 72. Turning device 81 is provided only in first support portion 72 out of first support portion 72 and second support portion 73. Turning device 81 is incorporated in first support portion 72.

Turning device 81 turns workpiece holder 61 around a turning center axis 120 extending in the X-axis direction. Turning center axis 120 extends in the X-axis direction at a position spaced upward from first top surface 12a and second top surface 13a.

As shown in FIG. 5, workpiece holder 61 includes a first arm portion 312, a base portion 311 and a second arm portion 313. Base portion 311 is provided between first arm portion 312 and second arm portion 313 in the X-axis direction. Base portion 311 is provided at a position which is away from turning center axis 120 in the radial direction. A rotation mechanism portion 316 for rotating pallet P around a rotation center axis 130 orthogonal to turning center axis 120 is incorporated in base portion 311.

First arm portion 312 extends inward in the radial direction of turning center axis 120 from an end portion of base portion 311 in the −X-axis direction. Second arm portion 313 extends inward in the radial direction of turning center axis 120 from an end portion of base portion 311 in the +X-axis direction.

Pallet P (main surface Pa) is arranged between turning center axis 120 and base portion 311 in the radial direction of turning center axis 120. Pallet P (main surface Pa) is arranged between first arm portion 312 and second arm portion 313 in the axial direction of turning center axis 120.

First support portion 72 includes a bearing housing 331, a bearing 332 and a shaft 333. Bearing housing 331 has a cylindrical shape having turning center axis 120 at the center thereof. Shaft 333 has an axial shape having turning center axis 120 at the center thereof. Shaft 333 is arranged inside bearing housing 331. Shaft 333 is connected to workpiece holder 61 (first arm portion 312) on the axis of turning center axis 120. Bearing 332 is interposed between bearing housing 331 and shaft 333.

Turning device 81 has a motor 320 and brake mechanism portions 334 and 335. Motor 320 has a rotor 321 and a stator 322. Rotor 321 is fixed to the outer peripheral surface of shaft 333. Rotor 321 is provided to be rotatable integrally with shaft 333. Stator 322 is fixed to the inner peripheral surface of bearing housing 331. Stator 322 is provided on the outer circumference of rotor 321. With such a configuration, motor 320 applies rotational force having turning center axis 120 at the center thereof to shaft 333.

Brake mechanism portions 334 and 335 are accommodated inside bearing housing 331. Brake mechanism portions 334 and 335 are provided on the outer circumference of shaft 333. Brake mechanism portions 334 and 335 operate between a locked state for restricting the rotation of shaft 333 around turning center axis 120 and an unlocked state for allowing the rotation of shaft 333 around turning center axis 120.

Second support portion 73 has a bearing housing 341, a bearing 342 and a shaft 343. Bearing housing 341 has a cylindrical shape having turning center axis 120 at the center thereof. Shaft 343 has an axial shape having turning center axis 120 at the center thereof. Shaft 343 is arranged inside bearing housing 341. Shaft 343 is connected to workpiece holder 61 (second arm portion 313) on the axis of turning center axis 120. Bearing 342 is interposed between bearing housing 341 and shaft 343. A sensor 344 for detecting the turning position of workpiece holder 61 around the axis of turning center axis 120 is incorporated in bearing housing 341.

Figure 6:
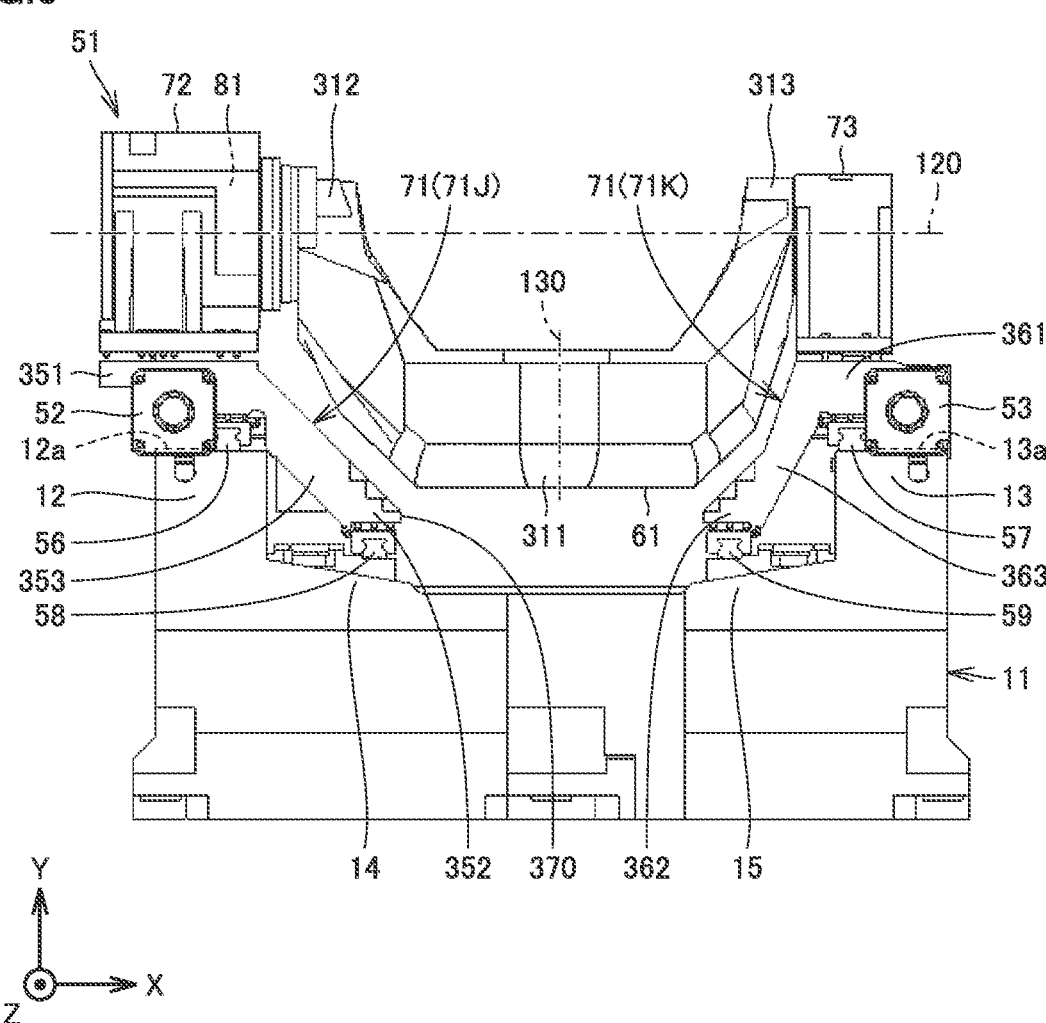
FIG. 6 is a front view partially showing the machine tool (when the table is in the reference posture) in FIG. 1.
Figure 7:
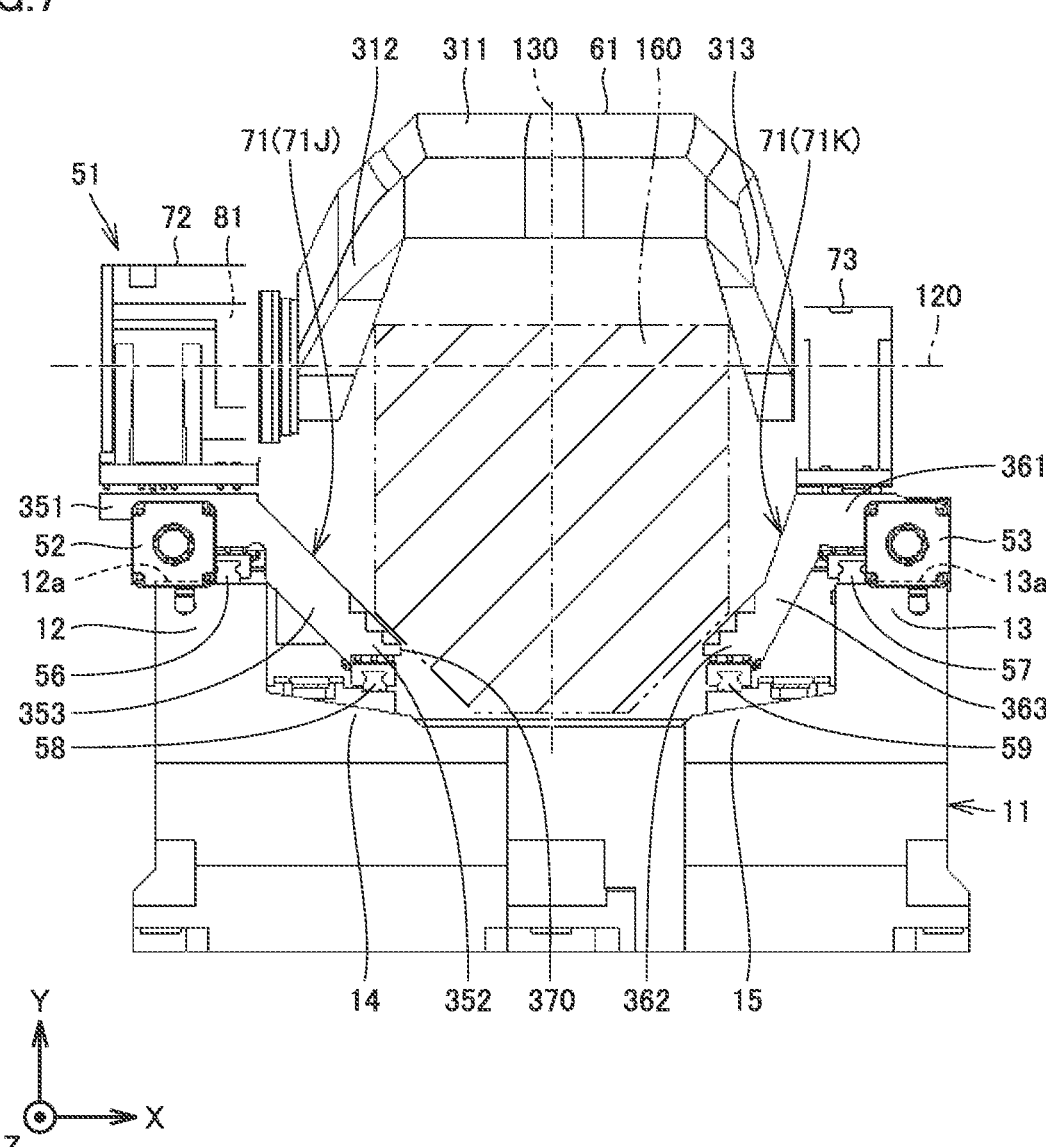
FIG. 7 is a front view partially showing the machine tool (when the table is in the inverted posture) in FIG. 1.
Figure 8:
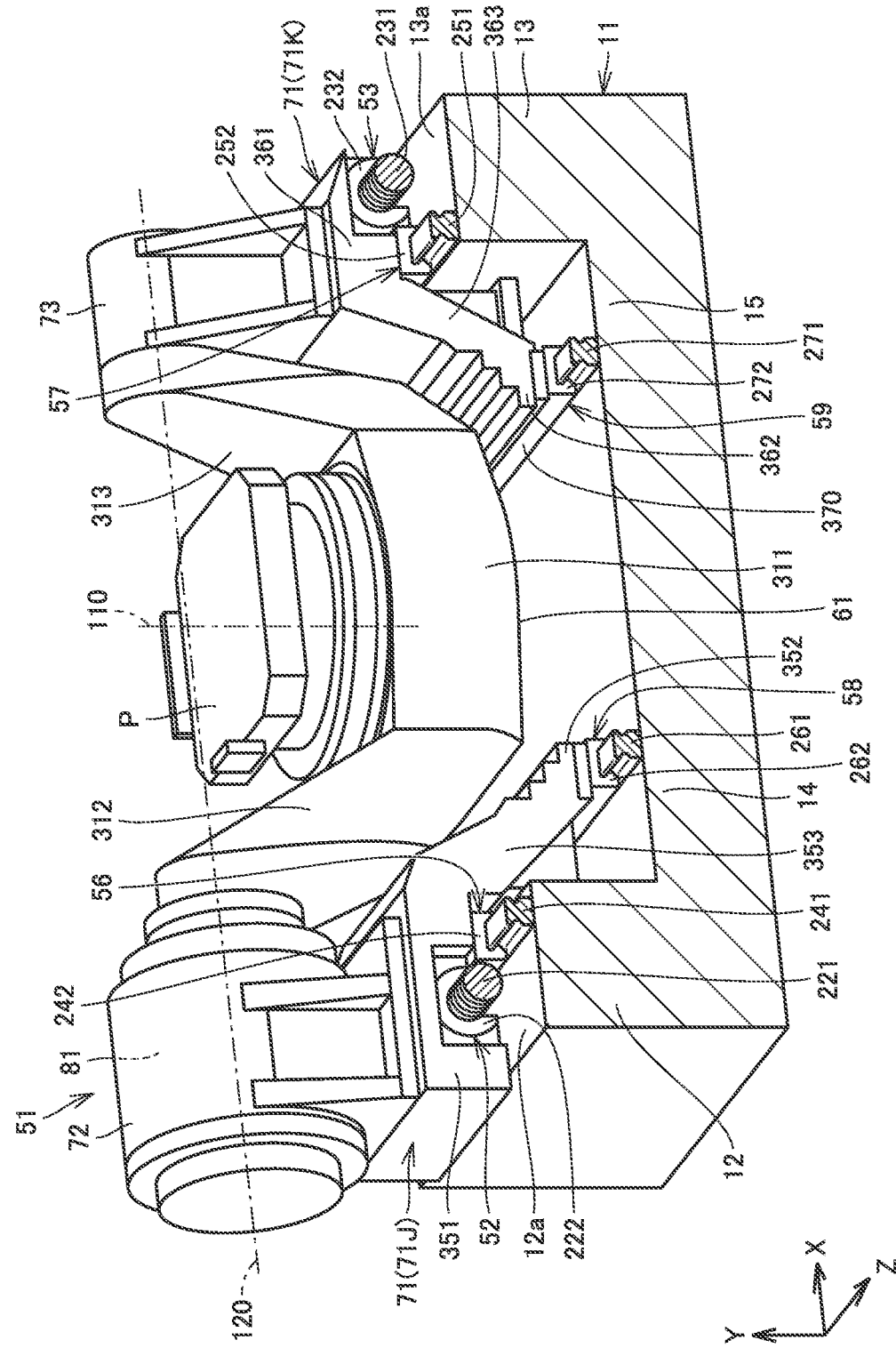
FIG. 8 is a perspective view schematically showing the machine tool in FIG. 6.

FIG. 6 is a front view partially showing the machine tool in FIG. 1 (when the table is in the reference posture). FIG. 7 is a front view partially showing the machine tool (when the table is in the inverted posture) in FIG. 1. FIG. 8 is a perspective view schematically showing the machine tool in FIG. 6.

FIG. 6 and FIG. 8 show table 51 in the reference posture in which main surface Pa of pallet P in FIG. 5 faces upward. FIG. 7 shows table 51 in the inverted posture in which workpiece holder 61 is turned by 180° around turning center axis 120 from the reference posture shown in FIG. 6 and FIG. 8, and main surface Pa of pallet P in FIG. 5 faces downward.

Referring to FIG. 6 to FIG. 8, bed 11 further has a first step portion 14 and a second step portion 15. First step portion 14 forms a step recessed downward from first peripheral wall portion 12. Second step portion 15 forms a step recessed downward from second peripheral wall portion 13.

First step portion 14 is provided between first peripheral wall portion 12 and second step portion 15 in the X-axis direction. Second step portion 15 is provided between first step portion 14 and second peripheral wall portion 13 in the X-axis direction. First top surface 12a is arranged above first step portion 14. First peripheral wall portion 12 has a convex shape protruding upward from first step portion 14. Second top surface 13a is arranged above second step portion 15. Second peripheral wall portion 13 has a convex shape protruding upward from second step portion 15.

Table base 71 has a first table base 71J and a second table base 71K. First table base 71J and second table base 71K are provided apart from each other in the X-axis direction. First table base 71J and second table base 71K are separated from each other in the X-axis direction.

First table base 71J has first support portion 72. Second table base 71K has second support portion 73. First support portion 72 is provided above first peripheral wall portion 12. Second support portion 73 is provided above second peripheral wall portion 13.

First table base 71J further has a first base upper end portion 351, a first base lower end portion 352, and a first base intermediate portion 353.

First base upper end portion 351 is provided on first peripheral wall portion 12. First base upper end portion 351 has a plate-like shape parallel to first top surface 12a. First support portion 72 is provided on first base upper end portion 351. First base lower end portion 352 is provided on first step portion 14. First base lower end portion 352 is arranged below workpiece holder 61 (base portion 311). First base lower end portion 352 is provided at a position which is displaced from first base upper end portion 351 in the +X-axis direction and the −Y-axis direction.

First base intermediate portion 353 extends between first base upper end portion 351 and first base lower end portion 352. First base intermediate portion 353 extends obliquely downward along the X-axis direction from first base upper end portion 351 to first base lower end portion 352. First base intermediate portion 353 is provided below first arm portion 312. First base intermediate portion 353 extends in parallel to first arm portion 312 between first base upper end portion 351 and first base lower end portion 352.

Second table base 71K further has a second base upper end portion 361, a second base lower end portion 362 and a second base intermediate portion 363.

Second base upper end portion 361 is provided on second peripheral wall portion 13. Second base upper end portion 361 has a plate-like shape parallel to second top surface 13a. Second support portion 73 is provided on second base upper end portion 361. Second base lower end portion 362 is provided on second step portion 15. Second base lower end portion 362 is arranged below workpiece holder 61 (base portion 311). Second base lower end portion 362 is provided at a position which is displaced from second base upper end portion 361 in the −X-axis direction and the −Y-axis direction.

Second base intermediate portion 363 extends between second base upper end portion 361 and second base lower end portion 362. Second base intermediate portion 363 extends obliquely downward along the X-axis direction from second base upper end portion 361 to second base lower end portion 362. Second base intermediate portion 363 is provided below second arm portion 313. Second base intermediate portion 363 extends in parallel to second arm portion 313 between second base upper end portion 361 and second base lower end portion 362.

An opening portion 370 is provided between first table base 71J and second table base 71K. Opening portion 370 forms an opening surface parallel to the X-axis-Z axis plane between first base lower end portion 352 and second base lower end portion 362. Opening portion 370 is provided above bed 11. Opening portion 370 is provided below workpiece holder 61. Opening portion 370 is provided below base portion 311.

Referring to FIGS. 1 to 8, machine tool 100 further includes a first feeding device 52 and a second feeding device 53. First feeding device 52 and second feeding device 53 drive table 51 in the Z-axis direction. First feeding device 52 and second feeding device 53 are provided on bed 11.

First feeding device 52 is connected to first support portion 72. Driving force from first feeding device 52 is transmitted to first support portion 72. First feeding device 52 is provided on first peripheral wall portion 12. First feeding device 52 is provided at a position facing first top surface 12a in the vertical direction.

First feeding device 52 has a screw shaft 221, a nut 222 and a servomotor 223. Screw shaft 221 extends in the Z-axis direction. Screw shaft 221 extends at a position facing first top surface 12a in the vertical direction. Screw shaft 221 is rotatably supported by a plurality of bearings (not shown) arranged apart from each other in the Z-axis direction. Nut 222 is fitted onto screw shaft 221 via a plurality of balls. Nut 222 is fixed to first table base 71J. Nut 222 is fixed to first base upper end portion 351. Screw shaft 221 and nut 222 constitute a ball screw. An output shaft of servomotor 223 is connected to screw shaft 221. Rotation from servomotor 223 is input to screw shaft 221.

Second feeding device 53 is connected to second support portion 73. Driving force from second feeding device 53 is transmitted to second support portion 73. Second feeding device 53 is provided on second peripheral wall portion 13. Second feeding device 53 is provided at a position facing second top surface 13a in the vertical direction.

Second feeding device 53 has a screw shaft 231, a nut 232 and a servomotor 233. Screw shaft 231 extends in the Z-axis direction. Screw shaft 231 extends at a position facing second top surface 13a in the vertical direction. Screw shaft 231 is rotatably supported by a plurality of bearings (not shown) arranged apart from each other in the Z-axis direction. Nut 232 is fitted onto screw shaft 231 via a plurality of balls. Nut 232 is fixed to second table base 71K. Nut 232 is fixed to second base upper end portion 361. Screw shaft 231 and nut 232 constitute a ball screw. An output shaft of servomotor 233 is connected to screw shaft 231. Rotation from servomotor 233 is input to screw shaft 231.

Base portion 311 of workpiece holder 61 which is set to the reference posture is arranged between first feeding device 52 (screw shaft 221 and nut 222) and second feeding device 53 (screw shaft 231 and nut 232) in the X-axis direction. First feeding device 52 (screw shaft 221, nut 222) is provided at a position overlapping first support portion 72 and turning device 81 in top view. First feeding device 52 and second feeding device 53 are provided below pallet P mounted on workpiece holder 61 which is set to the reference posture.

When the feeding device for applying driving force for moving table 51 in the Z-axis direction is provided only in first support portion 72 of first table base 71J in which turning device 81 is provided, there may occur a phenomenon in which the feeding of table 51 in the Z-axis direction is advanced on the side of first support portion 72 to which the driving force is applied and delayed on the side of second support portion 73 to which no driving force is applied. In particular, when table base 71 has a structure in which it is divided into first table base 71J provided with first support portion 72 and second table base 71K provided with second support portion 73, such a phenomenon occurs remarkably.

On the other hand, in the present embodiment, first feeding device 52 is connected to first support portion 72 of first table base 71J provided with turning device 81, and second feeding device 53 is connected to second support portion 73 of second table base 71K in which turning device 81 is not provided. Such a configuration causes first support portion 72 and second support portion 73 to follow each other excellently when table 51 moves in the Z-axis direction, so that table 51 can be smoothly moved in the Z-axis direction.

Further, opening portion 370 is provided between first table base 71J and second table base 71K due to the structure in which table base 71 is divided into first table base 71J and second table base 71K. As a result, it is possible to improve the discharge performance of chips generated on pallet P during machining of the workpiece.

Further, in the present embodiment, first feeding device 52 and second feeding device 53 are provided on first peripheral wall portion 12 and second peripheral wall portion 13 of bed 11 each of which has an upward rising wall shape. Such a configuration makes it possible to provide first feeding device 52 and second feeding device 53 near an upper position where the center of gravity of table 51 is located when an angle rest, a workpiece or the like is mounted on table 51. As a result, it is possible to restrain occurrence of vibration when table 51 moves in the Z-axis direction.

Further, in the present embodiment, first base intermediate portion 353 extends obliquely downward along the X-axis direction from first base upper end portion 351 to first base lower end portion 352, and second base intermediate portion 363 extends obliquely downward along the X-axis direction from second base upper end portion 361 to second base lower end portion 362. Such a configuration makes it possible to provide a maximum workpiece area (hatching area 160 shown in FIG. 7) under the inverted posture of table 51 between first base intermediate portion 353 and second base intermediate portion 363 in the X-axis direction.

Machine tool 100 further has a first guide portion 56, a second guide portion 58, a third guide portion 57 and a fourth guide portion 59.

First guide portion 56 and second guide portion 58 are provided on first table base 71J. First guide portion 56 and second guide portion 58 guide first table base 71J along the Z-axis direction.

First guide portion 56 is arranged at a position which is displaced upward in the Z-axis direction from second guide portion 58. First guide portion 56 is provided at a position which is displaced from second guide portion 58 in the −Z-axis direction and the +Y-axis direction. First guide portion 56 is provided on first peripheral wall portion 12. First feeding device 52 and first guide portion 56 are arranged side by side in the X-axis direction. Second guide portion 58 is provided on first step portion 14. First guide portion 56 is provided between first feeding device 52 and second guide portion 58 in the X-axis direction.

First guide portion 56 has a rail 241 and a slider 242. Rail 241 extends in the Z-axis direction. Rail 241 is attached to first peripheral wall portion 12 (first top surface 12a). Slider 242 is fitted to rail 241 via a plurality of balls. Slider 242 is guided by rail 241, whereby slider 242 is slidable in the Z-axis direction. Slider 242 is fixed to first table base 71J. Slider 242 is fixed to first base upper end portion 351. Rail 241 and slider 242 constitute a linear guide that is a linear guide mechanism.

Second guide portion 58 has a rail 261 and a slider 262. Rail 261 extends in the Z-axis direction. Rail 261 is attached to first step portion 14. Slider 262 is fitted to rail 261 via a plurality of balls. Slider 262 is slidable in the Z-axis direction by being guided by rail 261. Slider 262 is fixed to first table base 71J. Slider 262 is fixed to first base lower end portion 352. Rail 261 and slider 262 constitute a linear guide that is a linear guide mechanism.

Third guide portion 57 and fourth guide portion 59 are provided on second table base 71K. Third guide portion 57 and fourth guide portion 59 guide second table base 71K along the Z-axis direction.

Third guide portion 57 is arranged at a position which is displaced upward in the Z-axis direction from fourth guide portion 59. Third guide portion 57 is provided at a position which is displaced from fourth guide portion 59 in the +Z-axis direction and the +Y-axis direction. Third guide portion 57 is provided on second peripheral wall portion 13. Second feeding device 53 and third guide portion 57 are arranged side by side in the X-axis direction. Fourth guide portion 59 is provided on second step portion 15. Third guide portion 57 is provided between second feeding device 53 and fourth guide portion 59 in the X-axis direction.

Third guide portion 57 has a rail 251 and a slider 252. Rail 251 extends in the Z-axis direction. Rail 251 is attached to second peripheral wall portion 13 (second top surface 13a). Slider 252 is fitted to rail 251 via a plurality of balls. Slider 252 is guided by rail 251, whereby slider 252 is slidable in the Z-axis direction. Slider 252 is fixed to second table base 71K. Slider 252 is fixed to second base upper end portion 361. Rail 251 and slider 252 constitute a linear guide which is a linear guide mechanism.

Fourth guide portion 59 has a rail 271 and a slider 272. Rail 271 extends in the Z-axis direction. Rail 271 is attached to second step portion 15. Slider 272 is fitted to rail 271 via a plurality of balls. Slider 272 is guided by rail 271, whereby slider 272 is slidable in the Z-axis direction. Slider 272 is fixed to second table base 71K. Slider 272 is fixed to second base lower end portion 362. Rail 271 and slider 272 constitute a linear guide which is a linear guide mechanism.

Base portion 311 of workpiece holder 61 which is set to the reference posture is arranged between first guide portion 56 and second guide portion 58 in the X-axis direction. First guide portion 56 is provided at a position overlapping first support portion 72 and turning device 81 in top view. Second guide portion 58 is provided at a position overlapping second support portion 73 in top view. First guide portion 56 and second guide portion 58 are provided below pallet P mounted on workpiece holder 61 which is set to the reference posture.

Third guide portion 57 and fourth guide portion 59 are provided below base portion 311 of workpiece holder 61 which is set to the reference posture. Third guide portion 57 is provided at a position overlapping first arm portion 312 in top view. Fourth guide portion 59 is provided at a position overlapping second arm portion 313 in top view.

The distance between first feeding device 52 and first guide portion 56 in the X-axis direction is smaller than the distance between first guide portion 56 and second guide portion 58 in the X-axis direction. The distance between second feeding device 53 and third guide portion 57 in the X-axis direction is smaller than the distance between third guide portion 57 and fourth guide portion 59 in the X-axis direction. The distance between second guide portion 58 and fourth guide portion 59 in the X-axis direction is larger than the distance between first guide portion 56 and second guide portion 58 in the X-axis direction, and larger than the distance between third guide portion 57 and fourth guide portion 59 in the X-axis direction.

The distance between first guide portion 56 and second guide portion 58 in the vertical direction (Y-axis direction) is smaller than the distance between first guide portion 56 and turning center axis 120 in the vertical direction (Y-axis direction). The distance between third guide portion 57 and fourth guide portion 59 in the vertical direction (Y-axis direction) is smaller than the distance between third guide portion 57 and turning center axis 120 in the vertical direction (Y-axis direction).

In the present embodiment, since first guide portion 56 is arranged at a position which is displaced upward in the X-axis direction from second guide portion 58, the distance between first guide portion 56 and second guide portion 58 can be more increased. Further, since third guide portion 57 is arranged at a position which is displaced upward in the X-axis direction from fourth guide portion 59, the distance between third guide portion 57 and fourth guide portion 59 can be more increased. As a result, first table base 71J can be more stably guided along the Z-axis direction by first guide portion 56 and second guide portion 58, and second table base 71K can be more stably guided along the Z-axis direction by third guide portion 57 and fourth guide portion 59.

Further, in the present embodiment, first feeding device 52 is arranged side by side with first guide portion 56 arranged above second guide portion 58 in the X-axis direction, and second feeding device 53 is arranged side by side with third guide portion 57 arranged above fourth guide portion 59 in the X-axis direction. Such a configuration makes it possible to provide first feeding device 52 and second feeding device 53 near an upper position where the center of gravity of table 51 is located when an angle rest, a workpiece or the like is mounted on table 51. As a result, it is possible to restrain occurrence of vibration when table 51 moves in the Z-axis direction.

Moreover, in the present embodiment, first guide portion 56 and third guide portion 57 are provided on first peripheral wall portion 12 and second peripheral wall portion 13 respectively, and second guide portion 58 and fourth guide portion 59 are provided on first step portion 14 and second step portion 15, respectively. In such a configuration, by using the step structure of bed 11, first guide portion 56 and third guide portion 57 can be provided at different heights in the vertical direction, and second guide portion 58 and fourth guide portion 59 can be provided at different heights in the vertical direction.

Summarizing the structure of machine tool 100 according to the embodiment of the present invention described above, machine tool 100 according to the present embodiment includes bed 11, and table 51 that is provided on bed 11 and is movable in the Z-axis direction as a first axial direction parallel to the horizontal direction. Table 51 includes workpiece holder 61 that detachably holds the workpiece, table base 71 (71J, 71K) having first support portion 72 and second support portion 73 for turnably supporting workpiece holder 61 at positions spaced from each other in the X-axis direction as a second axial direction which is parallel to the horizontal direction and orthogonal to the Z-axis direction, workpiece holder 61 being mounted on table base 71, and turning device 81 that is provided in first support portion 72 and turns workpiece holder 61 around turning center axis 120 extending in the X-axis direction. Machine tool 100 further includes first feeding device 52 and second feeding device 53 that are provided on bed 11 and are connected to first support portion 72 and second support portion 73 respectively to drive table 51 in the Z-axis direction.

According to thus-configured machine tool 100 according to the embodiment of the present invention, table 51 can be smoothly moved in the Z-axis direction in machine tool 100 including cradle type table 51.

Note that the machine tool in the present invention is not limited to a horizontal machining center, but can also be applied to a vertical machining center, a multitasking machine having a lathe turning function and a milling function, or the like.

It should be noted that the embodiment disclosed at this time is illustrative in all respects and not restrictive. The scope of the present invention is indicated by the claims rather than the above description, and is intended to include all changes within the meaning and scope equivalent to the claims.

INDUSTRIAL APPLICABILITY

The present invention is applicable to a machine tool having a cradle type table.

REFERENCE SIGNS LIST

11 bed; 12 first peripheral wall portion; 12a first top surface; 13 second peripheral wall portion; 13a second top surface; 14 first step portion; 15 second step portion; 21 column; 22, 23, 42, 43 feeding device; 26, 27, 46, 47 guide portion; 31 saddle; 41 cross slide; 51 table; 52 first feeding device; 53 second feeding device; 56 first guide portion; 57 third guide portion; 58 second guide portion; 59 fourth guide portion; 61 workpiece holder; 71 table base; 71J first table base; 71K second table base; 72 first support portion; 73 second support portion; 81 turning device; 91 tool spindle; 100 machine tool; 110 center axis; 120 turning center axis; 130 rotation center axis; 160 hatching area; 221, 231 screw shaft; 222, 232 nut; 223, 233 servomotor; 241, 251, 261, 271 rail; 242, 252, 262, 272 slider; 311 base portion; 312 first arm portion; 313 second arm portion; 316 rotation mechanism portion; 320 motor; 321 rotor; 322 stator; 331, 341 bearing housing; 332, 342 bearing; 333, 343 shaft; 334, 335 brake mechanism portion; 344 sensor; 351 first base upper end portion; 352 first base lower end portion; 353 first base intermediate portion; 361 second base upper end portion; 362 second base lower end portion; 363 second base intermediate portion; 370 opening portion.

The invention claimed is:

1. A machine tool comprising:

a bed; and a table that is provided on the bed and is movable in a first axial direction parallel to a horizontal direction, wherein the table comprises:

a workpiece holder that detachably holds a workpiece;

a table base having a first support portion and a second support portion that turnably support the workpiece holder at positions spaced from each other in a second axial direction which is parallel to the horizontal direction and orthogonal to the first axial direction, the workpiece holder being mounted on the table base; and a turning device that is provided in the first support portion and is configured to turn the workpiece holder around a turning center axis extending in the second axial direction, and further comprising:

a first feeding device and a second feeding device that are provided on the bed and are connected to the first support portion and the second support portion respectively to drive the table in the first axial direction, the table base including first and second table bases, the first table base including the first support portion, the second table base including the second support portion and is provided apart from the first table base in the second axial direction, the table base including a first guide portion and a second guide portion that are provided on the first table base and are configured to guide the first table base along the first axial direction, the table base including a third guide portion and a fourth guide portion that are provided on the second table base and are configured to guide the second table base along the first axial direction, the first guide portion being arranged at a position which is displaced upward from the second guide portion and is displaced in the second axial direction from the second guide portion, the third guide portion being arranged at a position which is displaced upward from the fourth guide portion and is displaced in the second axial direction from the fourth guide portion, the second guide portion being arranged at a position between the first and fourth guide portions in the second axial direction, the fourth guide portion being arranged at a position between the second and third guide portions in the second axial direction.

2. The machine tool according to claim 1, wherein the bed has a first peripheral wall portion and a second peripheral wall portion that are provided at end portions of the bed in the second axial direction and extend in the first axial direction while forming upward rising wall shapes, and the first feeding device and the second feeding device are provided on the first peripheral wall portion and the second peripheral wall portion, respectively.

3. The machine tool according to claim 1, wherein the first feeding device is arranged side by side with the first guide portion in the second axial direction, and the second feeding device is arranged side by side with the third guide portion in the second axial direction.

4. The machine tool according to claim 1, wherein the bed includes a first peripheral wall portion and a second peripheral wall portion that are provided at end portions of the bed in the second axial direction and extend in the first axial direction while forming upward rising wall shapes, a first step portion forming a step that is recessed downward from the first peripheral wall portion, and a second step portion forming a step that is recessed downward from the second peripheral wall portion, wherein the first guide portion and the third guide portion are provided on the first peripheral wall portion and the second peripheral wall portion respectively, and wherein the second guide portion and the fourth guide portion are provided on the first step portion and the second step portion, respectively.

5. The machine tool according to claim 1, wherein the first table base includes a first base upper end portion provided with the first guide portion, a first base lower end portion provided with the second guide portion, and a first base intermediate portion that extends along the second axial direction from the first base upper end portion to the first base lower end portion and faces the workpiece holder in a vertical direction, and wherein the second table base includes a second base upper end portion provided with the third guide portion, a second base lower end portion provided with the fourth guide portion, and a second base intermediate portion that extends along the second axial direction from the second base upper end portion to the second base lower end portion and faces the workpiece holder in the vertical direction.

* * * * *